United States Patent [19]

Stoudt

[11] Patent Number: 4,676,015

[45] Date of Patent: Jun. 30, 1987

[54] OVER-CENTER SIGN STAND

[75] Inventor: Theodore L. Stoudt, Lake Oswego, Oreg.

[73] Assignee: Custom Stamping & Manufacturing Company, Portland, Oreg.

[21] Appl. No.: 699,483

[22] Filed: Feb. 7, 1985

Related U.S. Application Data

[63] Continuation of Ser. No. 595,640, Apr. 2, 1984, abandoned, which is a continuation of Ser. No. 406,300, Aug. 9, 1982, abandoned.

[51] Int. Cl.⁴ .......................... G09F 7/00; F16M 13/00

[52] U.S. Cl. .......................................... 40/608; 40/606; 248/623; 248/469

[58] Field of Search .................. 40/606, 608; 248/618, 248/622, 623, 624, 625, 469; 404/10; 272/76

[56] References Cited

U.S. PATENT DOCUMENTS

| | | | |
|---|---|---|---|
| 1,135,372 | 4/1915 | Gibson | 40/613 |
| 1,367,830 | 2/1921 | Poole | 40/608 |
| 1,903,683 | 4/1933 | Nute | 40/608 |
| 2,099,558 | 11/1937 | Belka et al. | 16/281 |
| 2,117,148 | 5/1938 | Clark | 16/281 |
| 2,532,996 | 12/1950 | Clark et al. | 16/281 |
| 2,602,684 | 7/1952 | Pinke | 16/281 |
| 2,949,324 | 8/1960 | Birge et al. | 40/608 |
| 3,013,381 | 12/1961 | Parsons | 40/614 |
| 4,137,662 | 2/1979 | Baumer | 40/608 |
| 4,498,657 | 2/1985 | Werner | 248/623 |

FOREIGN PATENT DOCUMENTS

| | | | |
|---|---|---|---|
| 241196 | 10/1962 | Australia | 40/602 |
| 1237231 | 6/1960 | France | 248/289.3 |
| 305406 | 2/1929 | United Kingdom | 272/76 |

*Primary Examiner*—Robert Peshock
*Assistant Examiner*—John G. Weiss
*Attorney, Agent, or Firm*—Grant L. Hubbard

[57] ABSTRACT

A sign stand for supporting signs in windy environments includes a base, a lower staff portion secured to the base, and an upper staff portion for receiving a display sign. The sign stand includes a platform support having a bracket secured thereto. A platform connected to the upper staff portion is pivotally mounted upon the bracket so that the upper staff portion has a range of pivotal motion in a plane. A spring exerts a force to urge the platform toward the platform support and to control the deflection of the upper staff portion whenever a force is applied to the upper staff portion to tend to rotate the platform about the bracket.

2 Claims, 5 Drawing Figures

OVER-CENTER SIGN STAND

This application is a continuation of 595,640 filed Apr. 2, 1984 and abandoned Feb. 7, 1985 which is a continuation of 406,300 filed Aug. 9, 1982 and abandoned June 6, 1984.

TECHNICAL FIELD

This invention relates to stands for supporting display signs for advertising, safety and for display purposes generally, with particular application to support display signs in windy environments.

BACKGROUND ART

The prior art is replete with efforts to solve the problem of permitting a sign to bend over and to return to its upright position upon the application and removal of a force, whether it be an automobile, an athlete, wind, or the application of some other force. Obviously, it is immaterial what the nature of the force is, since the only significant factor is that the sign stand must be capable of permitting the sign to bend over in response to the force and to return the sign stand to its normal vertical position once the force has been removed. The following prior art references are considered exemplary of the very devices which have been proposed to meet this need.

Danish Pat. No. 660,595, 1965, describes a display device which comprises a base, an upstanding frame structure having a relatively large surface area for receiving display indicia, a spring structure mounting the frame structure onto the base, the spring structure comprising spring means connected at two spaced apart locations between the lower portion of the frame structure and the base, the surface area of the frame being of a size which normally causes displacement upon application of sufficient force thereagainst, the spring structure normally maintaining the frame structure in an upright position and being yieldable in either direction along an axis, the resistance to deflection of the spring structure being such that the spring structure will deflect upon application of a force and permits the downward deflection of the frame structure.

Australian Pat. No. 241,196, 1962, discloses an advertising device which is supported in a similar manner, except that only one spring is used. Lagler, U.S. Pat. No. 2,243,912, discloses a display sign supported by a single spring and Felton, U.S. Pat. No. 1,828,892, discloses a support for a warning signal which operates upon the same principle, i.e., a flexible spring supporting the warning signal. A similar device is disclosed by Thompson, U.S. Pat. No. 2,193,747 and by Menachof, U.S. Pat. No. 2,155,992. Mayer, U.S. Pat. No. 1,089,143, discloses a resiliently biased swinging sign, which is supported by a vertical axis but permitted to swing around a vertical pivot being resiliently biased to a central position by a spring.

Hood, U.S. Pat. No. 2,165,704, discloses a spring supported sign stand which uses one or two vertical springs as the support for the sign. The springs are wound with the coils in contact with each other. Sarkisian, U.S. Pat. Nos. 3,662,482 and Sarkisian, 3,646,696 each discloses a coil spring supported sign stand which is a very minor variant of the Hood type device, the principal difference being that Sarkisian uses two spaced apart springs to prevent canting and twisting of the sign and to permit it to pivot only along a forward and backward axis, rather than in all directions. Sarkisian's sign, except for the function of the two spaced apart springs, functions on the same principle as is disclosed by Hood, as well as a number of other references. Henne, U.S. Pat. No. 2,292,785, discloses a sign stand which is supported by two spaced apart springs while Beck, U.S. Pat. No. 1,532,865 discloses a similar sign which is supported by a horizontal pivoting structure but biased in a vertical position by spaced apart springs.

The Danish Pat. No. 97389, 1963, discloses a display device which comprises a pair of spaced apart coil springs extending upwardly from a base, the upstanding frame structure secured to and supported on the upper ends of the springs, the frame having a relatively large surface area for receiving display indicia, the surface area of the frame being of a size which would only be displaced upon application of sufficient wind force thereagainst, the springs being yieldable in a direction to permit downward deflection of the frame structure.

Trump U.S. Pat. No. 2,144,038 discloses an antenna mount using support springs while Birge et al U.S. Pat. No. 2,949,324 discloses a flexible sign post in which the coils of the spring are in compression with respect to each other, the amount of compression being such that the springs will deflect upon application of a force thereto. Similar devices are shown by Franklin U.S. Pat. No. 1,726,817, Watts U.S. Pat. No. 1,487,635 and Lynch U.S. Pat. No. 1,013,410.

Other sign stands which permit the sign to bend or deflect upon application of a force are disclosed in West German Auslegeschrift No. 1,268,952, Corry U.S. Pat. No. 1,662,298, Doyle U.S. Pat. No. 2,096,275, Shotwell U.S. Pat. No. 1,449,063, Webb U.S. Pat. No. 626,256, Mueller Jr. et al U.S. Pat. No. 1,750,118, Bigelow U.S. Pat. No. 1,856,349, Donovan U.S. Pat. No. 2,164,680, Eara Sr. U.S. Pat. No. 3,616,557, Griswold U.S. Pat. No. 1,760,270, Meyer U.S. Pat. No. 2,168,912, Batcha U.S. Pat. No. 3,115,325, Lowe U.S. Pat. No. 2,308,525, and Rushmore U.S. Pat. No. 1,599,066.

There are other sign stands which permit, in one manner or another, some deflection; however, the foregoing are considered representative of the known prior art.

In general, two approaches have been taken to permit a sign resiliently to deflect upon application of force. In one category, i.e., pivot is provided and a resilient restoring means works in conjunction with the pivot to maintain the sign in a normal position, usually vertical. In the other approach, a resilient means is provided for supporting the sign, the application of force causing the resilient means to bend. These resilient means may include, most typically, coil springs or torsion springs. A pair of spaced apart springs are very commonly used to support signs and it is very common to use coil springs in which the various coils are in compression one with another. These approaches have been well-known and were well-known and widely used at least two or three decades ago.

The present invention provides an improved construction with a number of significant advantages, generally including a firm and solid non-resilient vertical mounting of the sign so that in the absence of considerable force the sign remains in a very stable upright vertical position and also providing off-center pivot means to permit, upon application of a predetermined amount of force, the sign to deflect.

STATEMENT OF THE INVENTION

The problems of the prior art have been manifold. Many of the devices do not hold the sign stand firmly and rigidly when no force is being applied and they tend to flutter in the wind. Other devices require the design of special springs for each size and configuration of sign. Still other devices are so expensive to manufacture that they have not met the needs of the industry for economical sign stands. Still others are so complex as to be unreliable. These and other problems are solved by the present invention. The present invention comprises a sign stand for supporting signs for display in windy environments. The sign stand comprises a base, a lower staff portion adapted to be secured to the base and an upper staff portion adapted to receive a display sign. The present invention is an improvement which comprises means connecting the lower staff portion and the upper staff portion to permit the upper staff portion to bend or deflect relative to the lower staff portion, the connecting means supporting the upper staff portion vertically rigidly, i.e., in the vertical direction the distance is rigidly controlled by non-resilient support means, above the lower staff portion. The present invention includes, in cooperative combination, platform support means secured to the lower staff, a platform secured to the upper staff portion and resting upon and supported by the platform support means and means which secured the platform resiliently to the platform support means, the platform and the upper staff being secured a predetermined non-resilient distance above the lower staff portion.

The present invention constitutes improvements in sign stands for supporting display signs in windy environments and comprises lower and upper staff portions and means for interconnecting these portions, the lower staff portion being so constructed and configured as to be secured to a base, or received in a base, the upper staff portion being so constructed and configured as to hold a sign, the improvement being in the means interconnecting the lower and upper staff portions and comprising platform support means secured to the lower staff portion constructed to support a platform a predetermined distance above the top of the lower staff portion, platform means supported by the platform support means non-resiliently said predetermined distance above the top of the lower staff portion, means offset from the center of the platform preferably in two directions for pivoting the platform, and hence the upper staff portion, relative to the platform support means and, therefore, relative to the lower staff portion, and means resiliently securing the platform to the platform to the platform means. The distance between the lower staff and the upper staff portions is fixed and the portions are connected such that pivoting of the platform in one direction or in an opposition direction relative to and always supported by the platform means allows the portions to bend relative to each other. The platform support means, in the preferred embodiment, comprises means secured to and extending upwardly from the lower staff portion and having formed at the upper end thereof a generally flat central support portion upon which the platform rests in the vertical position of the upper staff portion. Also in the preferred embodiment, the platform support means comprises at least one notch, and preferably two, on each side of the central support portion and the platform comprises a pivotal member secured to the platform in each side of the central portion thereof, the pivotal members respectively being received in notches on each side of the central support portion of the support means. The resilient securing means exerts a downward force on the platform permitting the platform to pivot on the pivotal members resiliently against this downward force and, in the preferred embodiment, the resilient securing means includes means for permitting adjustment of the downwardly exerted force upon the platform.

BRIEF DISCUSSION OF THE DRAWINGS

DESCRIPTION OF THE BEST MODE

In describing the best mode, as presently contemplated, it is clearly to be understood that this is a descriptive of the presently existing prototype and that, with further developmental experience, it is expected that the design may be simplified and streamlined, various parts may be made integral or unitary one with another, etc.; nevertheless, the presently preferred embodiment and best mode is as described and the various improvements and modifications thereof will be well within the skill of the art and will be encompassed within the concept and scope of this invention. Other modifications of more or less economic or convenient value may be made without departing from the scope of this invention. Accordingly, the drawings and the description should be considered as merely exemplary and of describing the principal operation and not in defining the particular details of construction of the various components.

Figure 1:
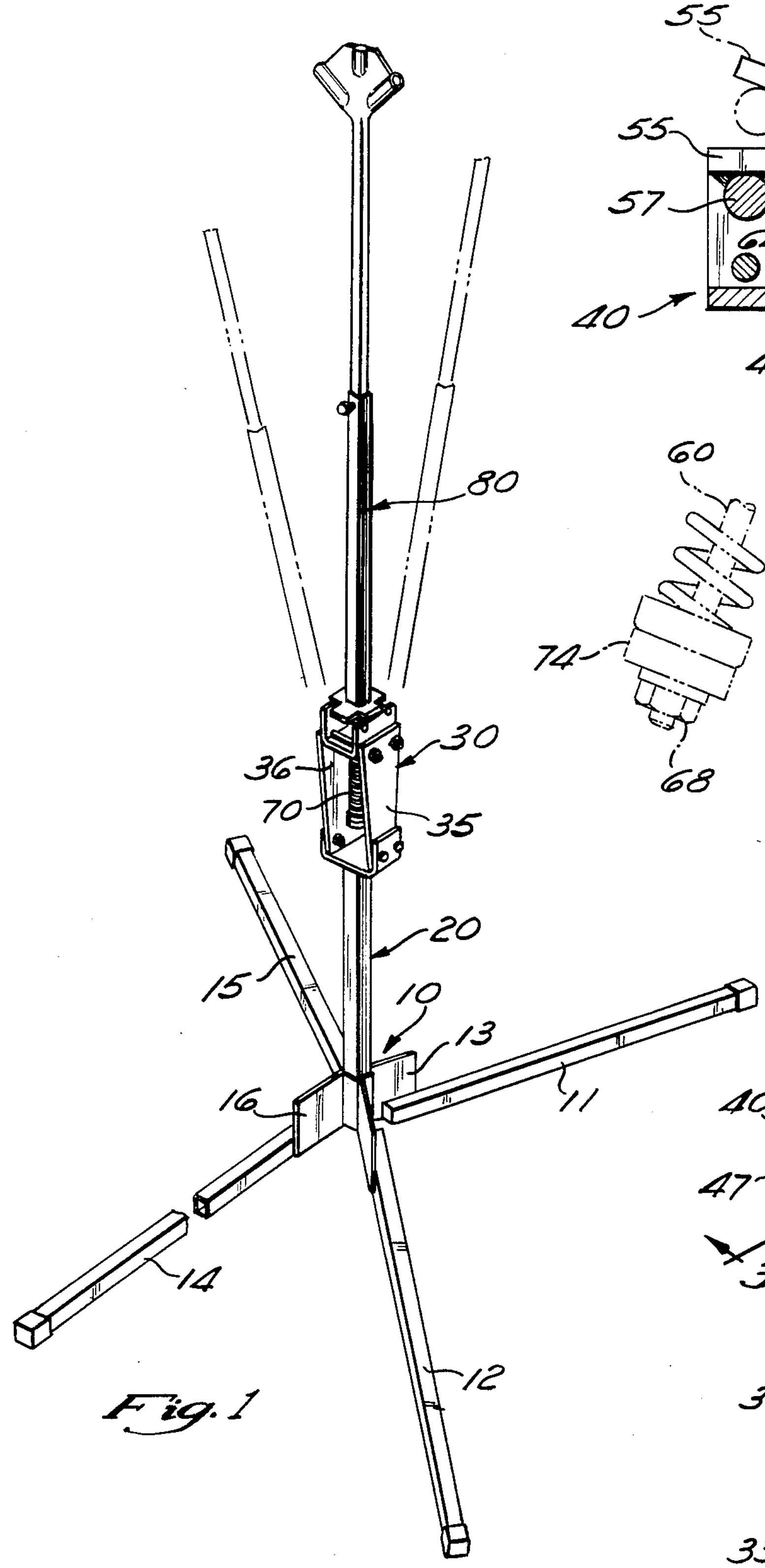
FIG. 1 is a perspective view of the overall assembly of this invention, including a base, lower and upper staff portions and the means interconnecting the lower and upper staff portions.

Reference is made first to FIG. 1. The invention is designed for use with the base which is shown generally at 10. The base 10 is shown as a portable base, although non-portable bases may be used as well. The design and construction of the base is of no importance to the present invention, except insofar as it is to be adapted to receive or be secured to the lower staff portion 20 as shown in FIG. 1. An upper staff portion 80 is secured by interconnecting means 30 to the lower staff portion 20. The interconnecting means 30 constitutes the improvement of this invention.

Returning to the base of FIG. 1, the base, in the exemplary embodiment, comprises legs 11 and 12 connected to a bracket 13 and legs 14 and 15 connected to a bracket 16, the entire combination being so constructed and configured as to permit attachment thereto of a lower staff portion 20 which, in use, is vertical. In the description of this specification, it will be assumed that the sign stand is used in the vertical positions; however, other than the various terminology, the sign stand may be used in any position. For convenience only, the sign stand will be described in use in the vertical position.

Figure 3:
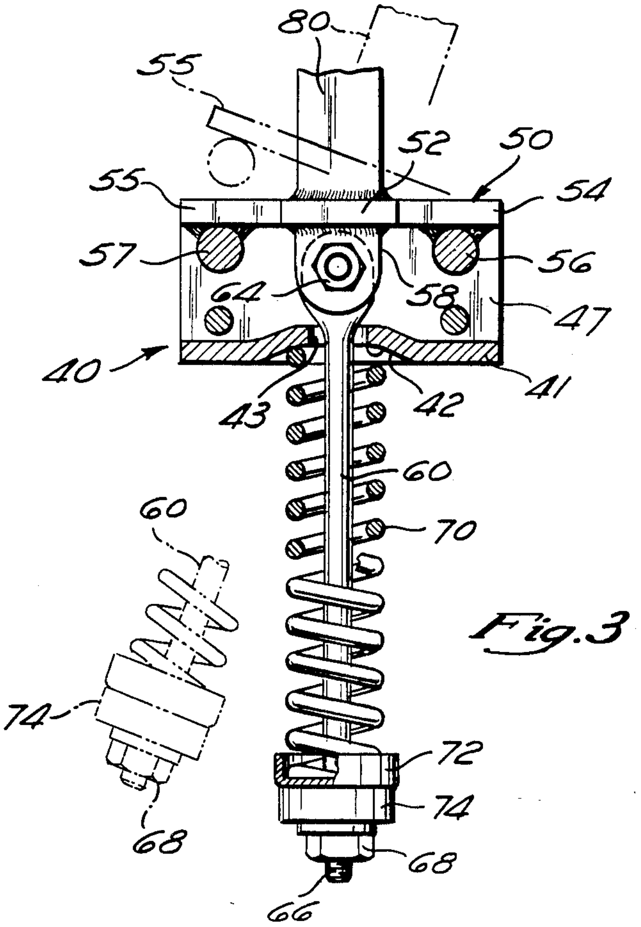
FIG. 3 is a side view, in partial cross-section, showing the internal structure of the interconnecting means taken along lines 3—3 of FIG. 2.
Figure 2:
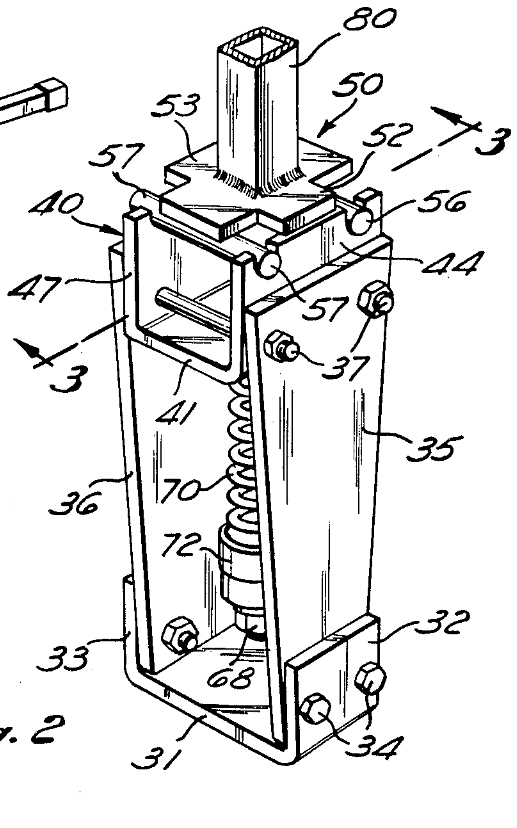
FIG. 2 is an enlarged, detailed perspective view of the means interconnecting the lower and upper staff portions.
Figure 4:
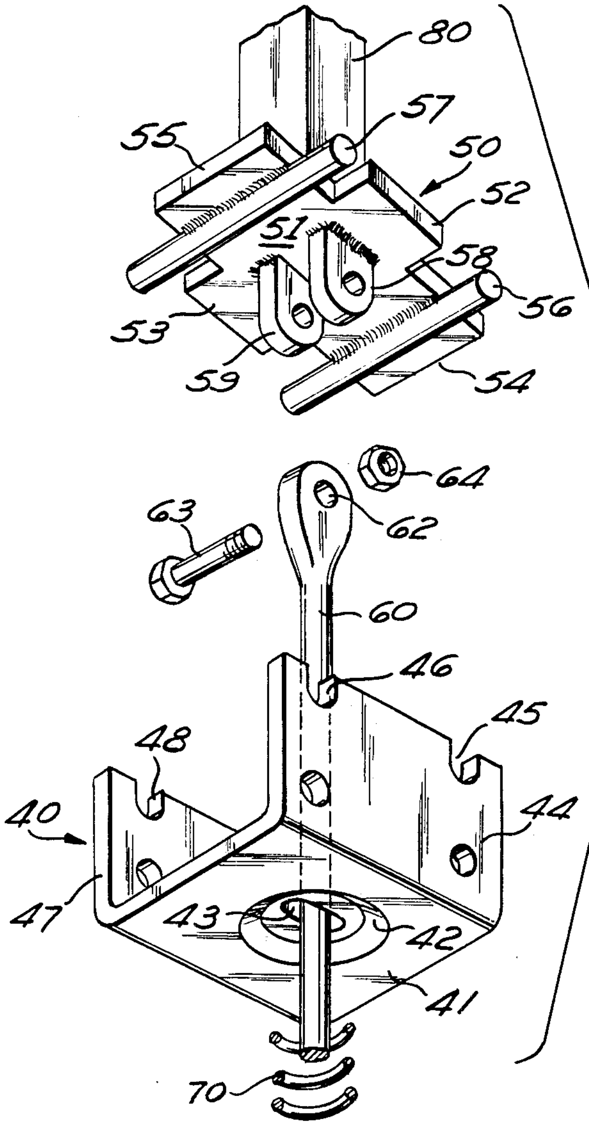
FIG. 4 is an exploded perspective view of the pivotal means and showing the interconnection of the resilient means in the means interconnecting the lower and upper staff portions.

The interconnecting means 30, which permits the upper staff portion 80 to bend or pivot on off-center pivots relative to the lower staff portion 20, is shown in detail in FIGS. 2, 3 and 4 to which reference is now made. The interconnecting means comprises a platform support means. The platform support means may be of any of various constructions. In the embodiment which is described as exemplary, the platform support means includes a U-shaped bracket with a base 31 and upwardly extending portions 32 and 33 through which apertures are formed to receive bolts, or other fasteners 34 to connect extending legs 35 and 36 which are, in turn, apertured to receive bolts or other fasteners 37. This structure may be made as a single piece. Quite obviously, the details may be varied considerably. Indeed, a single upward structure may serve this function. The upper part of the platform support means is a U-shaped bracket 40, having a base 41 which has formed therein a recess 42 and which is provided with an elongate slot or aperture 43. Upwardly extending portions 44, having notches 45 and 46, offcenter of the axis of the upper and lower staff portions and of the central portion of the bracket and leg 47 which, likewise, has a pair of notches, one of which is shown at 48 in FIG. 4 provides a central support portion and notches on each side of the central support portion. The bracket 40 is secured to the leg units 35 and 36 by bolts 37.

The platform 50, which is secured to the bottom of the upper staff portion 80, comprises central area 51 with central portions 52 and 53 extending outwardly therefrom and portions 54 and 55 extending perpendicularly to the portions 52 and 53 off-center of the upper staff portion 80. Pivotal members 56 and 57 which provide pivot axes offset from the central area are secured off-center of the central portion on the bracket and are received in the notches of 45 and 46 respectively and 47 and 48 respectively of the platform support means. The pivotal members which are secured off-center of the central portion and of the axes of the upper and lower staff portions are received, respectively, in notches on each side of the central support portion of the support means and form a pivot means of the invention.

It will be seen from the description thus far, that the upper staff portion, and hence the sign, is supported rigidly in the vertical direction, i.e., non-resiliently, by the platform supporting means and the platform. There is no spring support and there is no resiliency whatever in this support.

In order to keep the platform in position on top of the platform support means, means are provided to exert a downward force on the platform, holding it downwardly onto the platform support means. This securing means comprises, in the exemplary embodiment, a pair of downwardly exending ears which are apertured, shown at 58 and 59 which receive therebetween the end of a shaft 60, which is provided with an aperture 62 and which is secured by means of a bolt and nut 63 and 64 to the ears 58 and 59. The bottom end of the shaft 60 is secured by a bolt 66 and a nut 68 in conventional manner. A spring, in which the coils are spaced one from another, i.e., the coils are not in compression with respect one to another, is received around the shaft 60. This spring 70 is received, at its upper end in the recess 42 and is secured at the lower end by a spring retaining washer 72 and cup 74. Obviously, the details of retention and securement are of no particular consequence so long as the principal operation is maintained. Indeed, any means of providing a downward force may be used, e.g., weights.

The principle of operation may be described as follows: The upper staff and hence the sign is supported in a fixed or rigid sense vertically, i.e., nonresiliently in the vertical position, by the resting of the platform, central portions 52 and 53, upon a central portion of the platform support means. This prevents any rocking, wabbling, or fluttering of the sign. When enough force is exerted upon the sign to overcome the downward force, and to begin the pivotal movement of the sign, then the sign pivots on one or the other, depending upon the direction of the applied force, of the pivot members 56 or 57 which are off-center with respect to the central portion of the platform and the axes of the upper and lower staff portions. This combination of a central support and off-center pivot members provide greater stability in the vertical position and yet permits great flexibility in permitting the sign to deflect when sufficient force is applied. The principle of operation, thus differs totally from those signs in which the sign is supported by a resilient member, e.g., a coil spring, whether or not the coils are in compression one with another. In this invention, the spring performs absolutely no supporting function. Its sole function is to exert a downward force, rather than an upward force as is the case in other inventions. The present invention also departs conceptually and structurally on the prior art in providing the combination of a central support portion and a pair of off-center pivot members.

In the exemplary embodiment, the pivot members extend outwardly from the platform and are received in a pair of notches on each side of the central portion. This is a preferred, convenient and very stable structure but considerable design variability is permitted in this area provided that only that the off-center pivotal function remains.

One of the disadvantages of the prior art spring mounted sign stands is that it was necessary to design or select a spring to meet the particular weight and size of a given sign. Thus, with the given sign stand only one size or weight, or at most a limited number of sizes or weights of signs could be used. If a different size or weight of sign was to be used, a different sign stand had to be built. One great advantage of the present invention is that by means of the nuts 66, or other adjusting means which will adjust the degree of compression of the spring 70, the sign stand can be adjusted to receive any of a large variety of weights and sizes of signs. This adjustability factor is very important in certain industries where different signs are used for different purposes at different locations.

From the description of the embodiment which is shown in the drawings, which is merely exemplary, it will be apparent that a new mode of operation, a new function, and a new means of performing that function have been provided in which the elements cooperatively act together to perform a new and unpredictable result. Considerable variation is permitted in the design of the particular components provided only that the principle of operation remains.

Figure 5:
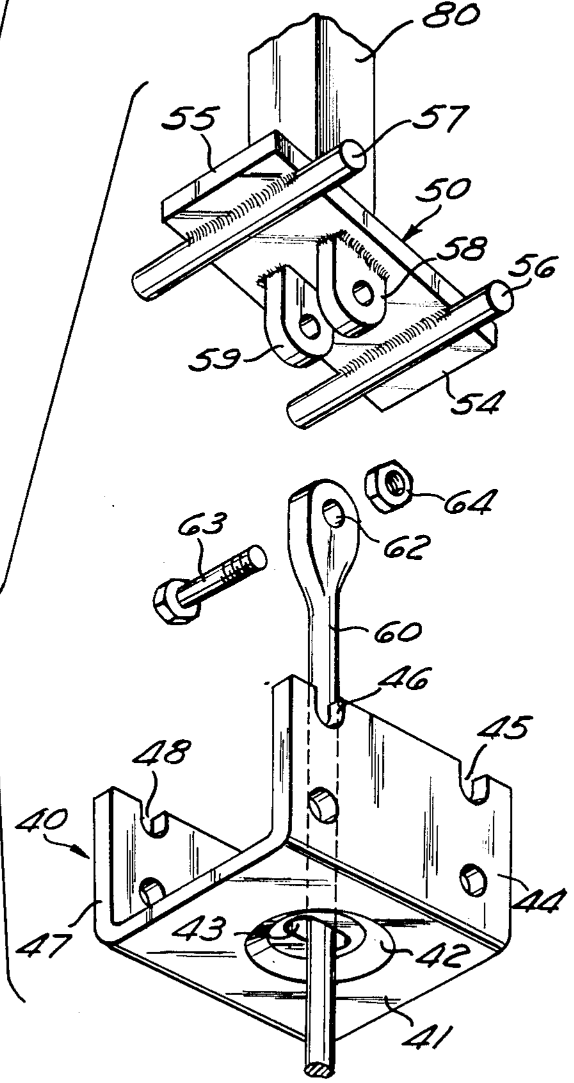
FIG. 5 is an alternative construction of the interconnecting means of this invention, in exploded perspective corresponding, except for the alternative construction generally to the construction shown in FIG. 4.

An alternative approach, using substantially the same principle of operation, is shown in FIG. 5, which is substantially identical to FIG. 4 except that the central support area of the platform is not utilized, the upper staff portion and sign attached thereto being supported entirely by the pivotal means. The central extensions 52 and 53 shown in FIG. 4 are omitted, along with the desirable function thereof.

It will be understood that the notches 45, 46, 47 and 48 may be enclosed so as to form slots which would hold the pivotal rods 56 and 57 captive. Other variations may, of course, be made without departing from the scope of the invention.

INDUSTRIAL APPLICATION

Sign stands of this invention are suitable for use in advertising, as highway safety signs, and in other environments, especially in environments where the wind exerts a force upon the sign or in which there is a likelihood that other forces may be exerted upon the sign.

What is claimed is:

1. A sign stand for supporting signs for display in windy environments, comprising:

a base;

a first staff having a first end affixed to the base and a second end extending away therefrom;

an interconnecting portion comprising a first bracket connected to the second end of the first staff;

a second bracket connected to the first bracket;

a second staff adapted for mounting a sign, the second staff having a platform extending from a first end thereof, the platform having a central portion resting upon the interconnecting portion to provide vertical stability;

means for urging the platform toward the interconnecting portion;

a first pivotal member extending from the platform to define a first pivotal axis, the second bracket including first notch means formed therein for pivotally mounting the first pivotal member thereto;

a second pivotal member extending from the platform to define a second pivotal axis parallel to the first pivotal axis, the second bracket having a second notch means formed therein for pivotally mounting the second pivotal member, the platform being pivotal only about the first and second pivotal axes in response to application of wind forces to the sign;

a shaft mounted to the platform to permit pivotal motion of the platform only about the pair of pivotal axes;

means for biasing the shaft to urge the platform toward the second bracket to retain and support the platform and second staff upon the interconnecting portion, and to control deflection of the second staff about the pair of pivotal axes in response to forces tending to rotate the second staff relative to the interconnecting portion, the shaft being supported during pivoting by the respective pivotal members; and means for adjusting the bias to control the angle of deflection of the second staff in response to application of a particular wind force to the sign.

2. A sign stand for supporting signs for display in windy environments, comprising:

a self-standing base for mounting the sign stand upon a surface;

a first staff having a first end affixed to the base, and a second end extending away therefrom;

a second staff having a first end and a second end, the second end of the second staff including means for mounting a sign thereto;

a platform extending from the first end of the second staff;

an interconnecting portion mounted between the second end of the first staff and the platform, the interconnecting portion including:

a first bracket connected to the second end of the first staff, the first bracket having a pair of legs generally parallel to the first staff to form a generally U-shaped configuration;

a second bracket mounted between the legs of the first bracket, the second bracket having a base positioned between the legs of the first bracket, and a pair of generally parallel platform support legs extending beyond the legs of the first bracket, the base of the second bracket having an elongate slot therein, the platform support legs having a first and a second pair of aligned notches therein, the first and second pairs of aligned notches being generally parallel and spaced apart;

a first pivotal member extending from the platform for positioning in the first pair of aligned notches to define a first pivotal axis;

a second pivotal member extending from the platform for positioning within the second pair of aligned notches to determine a second pivotal axis generally parallel to the first pivotal axis, the platform having a range of pivotal motion about the first and second pivotal axes so that the second staff has a range of motion confined to a plane generally perpendicular to the first and second pivotal axes in response to forces generated by wind blowing upon the sign attached to the second staff;

a pair of central portions extending from the platform between the first and second pivotal axes to rest upon the platform support legs;

a shaft extending through the elongate slot in the base of the second bracket and connected to the platform to permit pivotal motion of the platform only about the pivotal axes, and a second end extending away from the base of the second bracket;

a spring positioned around the shaft and retained between the second end thereof and the base of the second bracket, the spring being in compression to urge the platform toward the second bracket to maintain the platform upon the second bracket and to control the deflection of the second staff in response to forces applied to cause the second staff to move in the plane; and means for adjusting the compression of the spring for controlling the angle of deflection of the second staff in response to a predetermined wind force on the sign.

* * * * *